No. 735,498. PATENTED AUG. 4, 1903.
J. L. HALL.
SHUTTER FOR SEARCH LIGHTS.
APPLICATION FILED AUG. 11, 1900.
NO MODEL. 4 SHEETS—SHEET 1.

Witnesses
Inventor
John L. Hall
by Albert E. Davis
Atty.

No. 735,498. PATENTED AUG. 4, 1903.
J. L. HALL.
SHUTTER FOR SEARCH LIGHTS.
APPLICATION FILED AUG. 11, 1900.
NO MODEL. 4 SHEETS—SHEET 2.
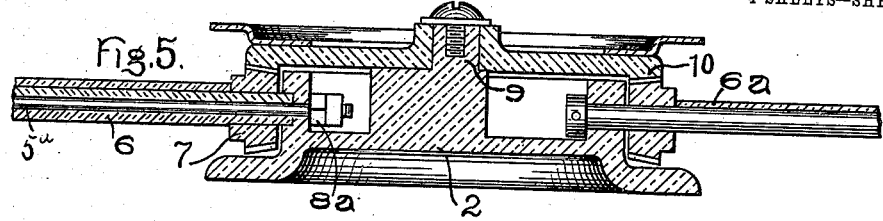
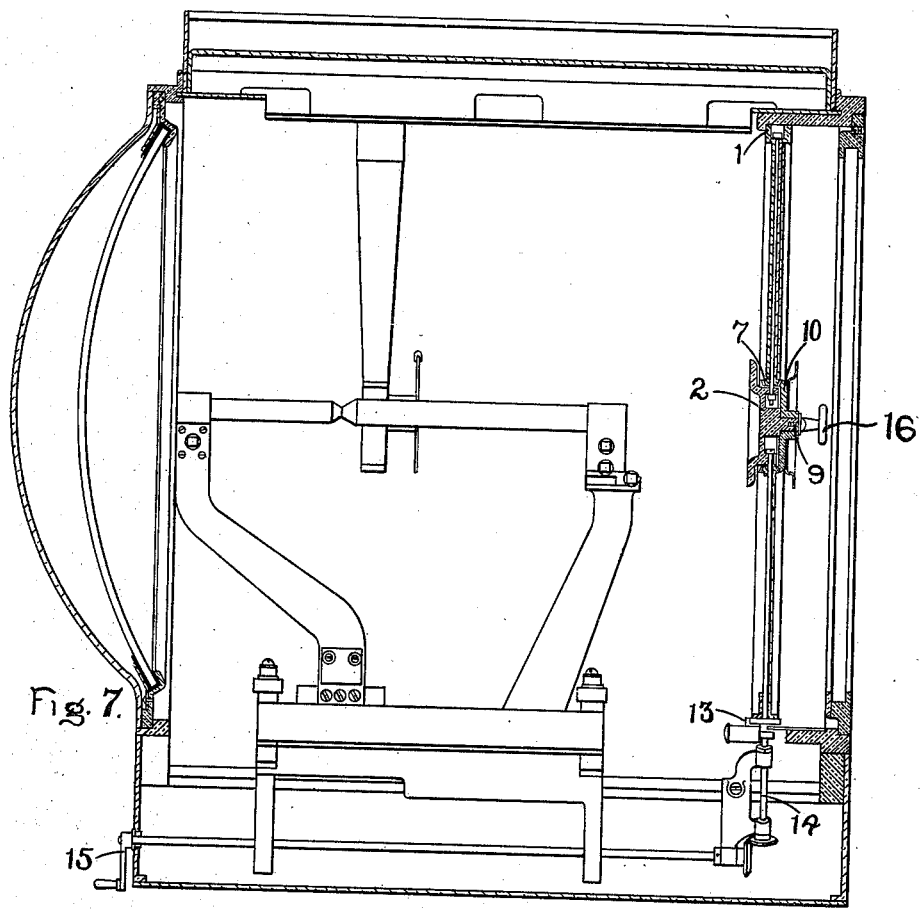
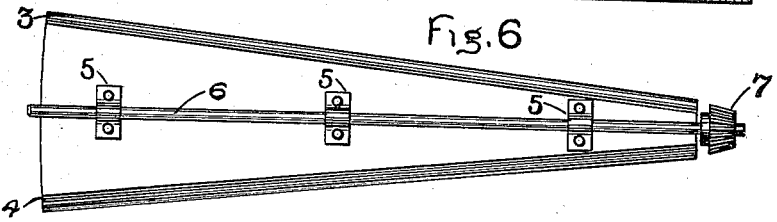
Witnesses
Inventor
John L. Hall
by Albert G. Davis
Atty.

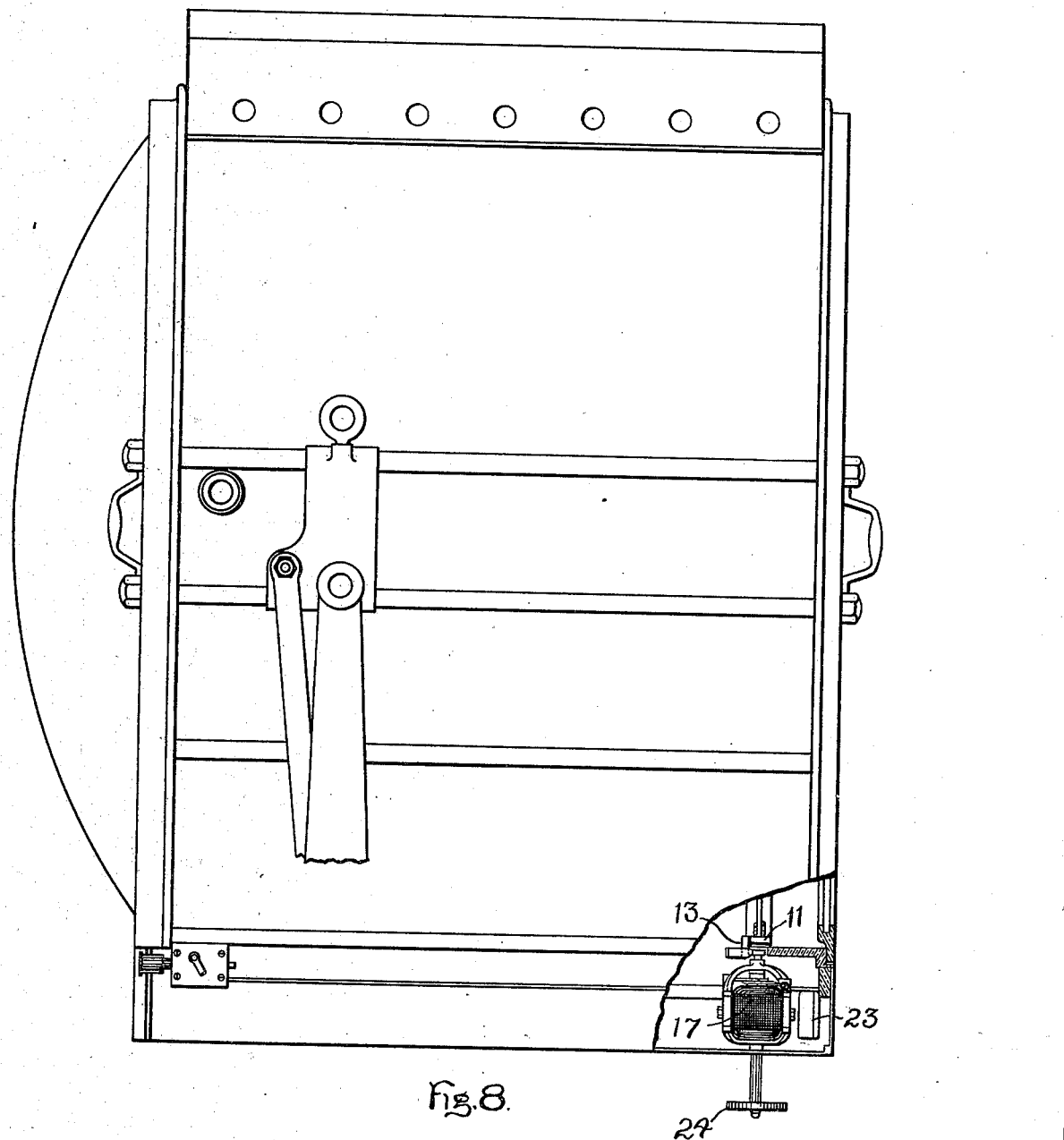

No. 735,498. Patented August 4, 1903.

UNITED STATES PATENT OFFICE.

JOHN L. HALL, OF SCHENECTADY, NEW YORK, ASSIGNOR TO THE GENERAL ELECTRIC COMPANY, A CORPORATION OF NEW YORK.

SHUTTER FOR SEARCH-LIGHTS.

SPECIFICATION forming part of Letters Patent No. 735,498, dated August 4, 1903.

Application filed August 11, 1900. Serial No. 26,555. (No model.)

*To all whom it may concern:*

Be it known that I, JOHN L. HALL, a citizen of the United States, residing at Schenectady, county of Schenectady, State of New York, have invented certain new and useful Improvements in Shutters for Search-Lights, of which the following is a specification.

The object of this invention is to provide a signaling-shutter for search-light projectors capable of rapid and effective operation and cheap in construction.

In carrying out the invention I provide a frame in the front of the drum of the projector in which are mounted a number of radial slats adapted to rock on bearings to open or close the shutter, the several slats being connected with a common controlling device, so that all may be operated simultaneously. The slats are constructed so as to overlap to effectively shut off the light when closed and may be operated manually by a handle outside the projector-drum provided for the purpose or may be controlled electrically by an electromagnetic operating device. The several slats are on spokes connecting a hub at the center and a supporting-rim, a bevel-pinion being mounted on each slat, meshing into a coöperating gear, to which motion is given by the operating device.

The invention embodies various structural features, the novelty of which will be more fully described hereinafter and will be definitely indicated in the appended claims.

Figure 1:
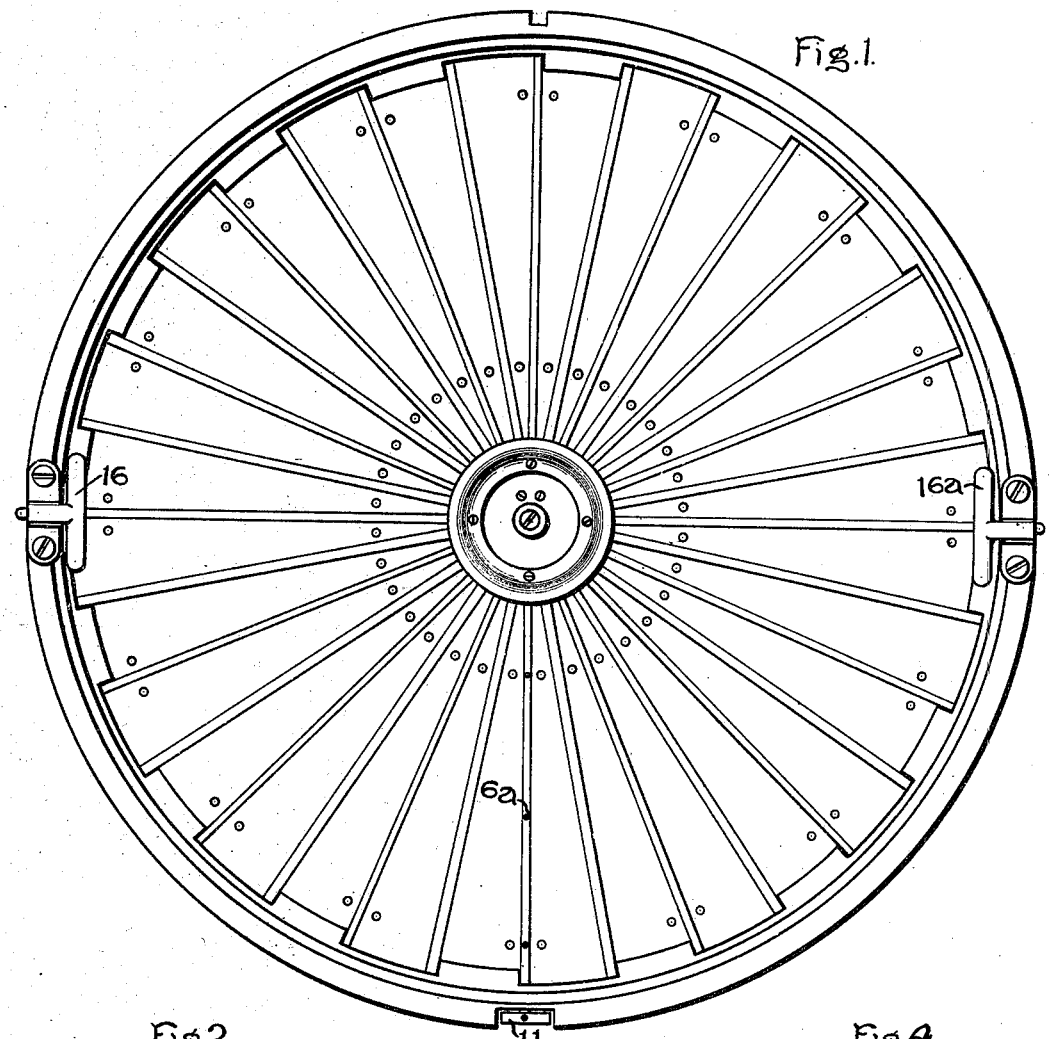
Figure 9:
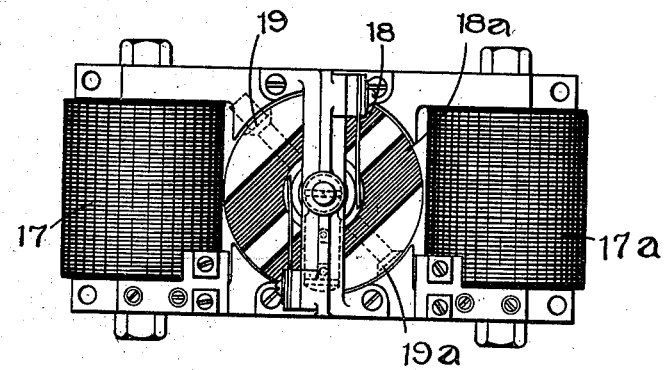
Figure 10:
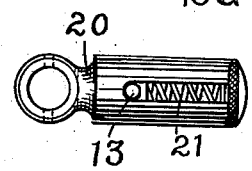
Figure 11:
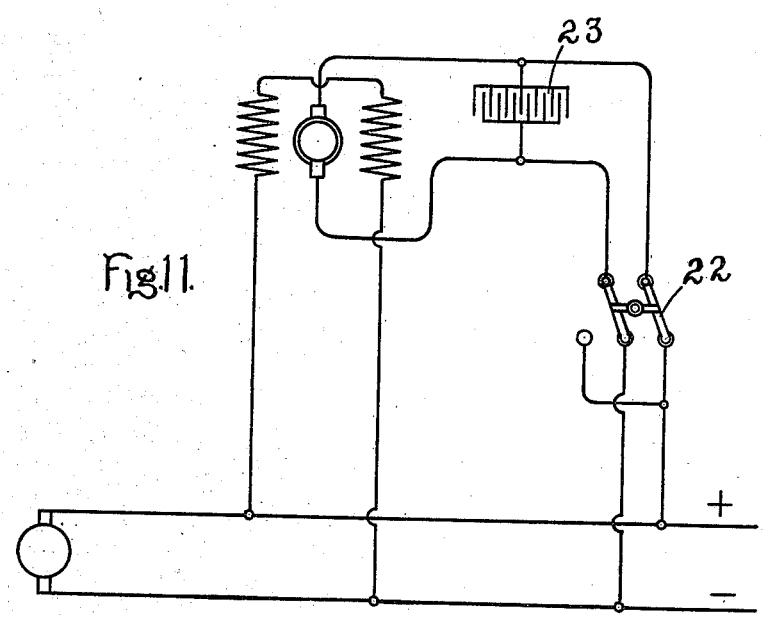

In the accompanying drawings, which illustrate the invention, Figure 1 is a front view of a shutter embodying my improvements. Figs. 2, 3, 4, 5, 6, and 10 are detail views of shutter parts. Fig. 7 is a sectional view of a projector provided with the shutter of my invention mounted for operation with a hand-controlling device. Fig. 8 is a side elevation, partly in section, of a projector provided with a magnetically-operated shutter. Fig. 9 is a detail view of the magnetic operating device, and Fig. 11 is a diagram of the controlling-circuits.

Figure 2:
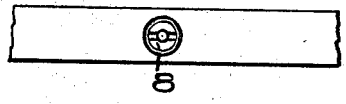
Figure 4:
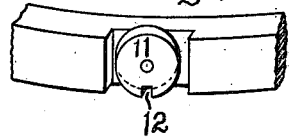
Figure 3:
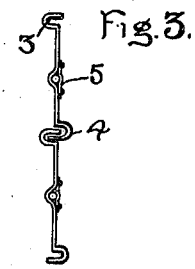

Referring first to Figs. 1 to 7, in which the structural details of the shutter are best shown, 1 represents a metallic rim, and 2 a hub connected by radial spokes, on which are mounted so as to freely turn a series of radial slats formed of sheet-aluminium. These slats are of substantially triangular shape, having the apex of the triangle cut off, and are pressed or stamped with a curled or bent edge, as indicated at 3 4, (see Figs. 3 and 6,) the curl being in opposite directions at the two sides of the slat, so that adjacent slats overlap when the shutter is closed and preferably interlock, so as to effectively shut off the light from the front of the projector. These slats are riveted by sheet-metal cleats 5 to a tube 6, extending the length of the slat, which is journaled on wire spokes $5^a$, connecting the rim and hub. The outer rim is formed of cast aluminium and is bored to receive nuts 8 on the ends of the spokes, as indicated in Fig. 2. The other end of the spoke passes through the hub and is similarly secured in place by a nut, as indicated in Fig. 5 at $8^a$. Turning on the pivot 9 (see Fig. 7) in the front of the hub and held in place by a washer and set-screw, as indicated, is a bevel-gear 10, engaging the several pinions 7, which rock the slats. One slat, as shown at $6^a$ in Figs. 1 and 5, is riveted to an arbor pivoted in the rim and hub and carries a crank-disk 11, (see Figs. 1 and 4,) having a slot, as indicated at 12, in its edge to engage with a spring-pressed pin 13, (see Figs. 7 and 10,) mounted on a socketed stem secured to a post 14, supported in the drum of the projector and operated by bevel-gearing, as indicated in Fig. 7, and a handle 15 on the outside of the projector or by other suitable operating devices, as hereinafter to be more fully described. Thus when the operating device is rocked the pivot of the operating-slat is turned, and through the instrumentality of the bevel-gearing 7 10 all of the slats are simultaneously rocked on their pivots and may be thrown to a closed position, as indicated in Fig. 1, or to an open position in a plane normal to that of Fig. 1. The crank-disk 11 is recessed for the purpose of permitting the shutter to be removed when desired, and for this purpose it is arranged to form a good sliding fit with the frame of the door. The door being removed the shutter may be held by the handles 16 16$^a$ (see Fig. 1) and pushed into the casing, pressing the spring-pressed pin 13 in the socket in which it is mounted, so that when the socket is turned the pin drops into the slot 12 and effects a mechanical connection between the shutter-operating devices and the crank-disk 11.

The system of gearing for the several slats is indicated in enlarged section in Fig. 5, from which the construction will be sufficiently evident in connection with the foregoing description.

In controlling the shutter electrically I mount within the drum an electromagnet having a wire-wound armature and control the circuit by a push-switch, a condenser being employed in shunt to the armature to absorb the spark. This organization will be understood from a comparison of Figs. 8, 9, 10, and 11. The electromagnet is preferably formed of a field-core provided with two coils 17 17$^a$, so as to develop a consequent pole, within which is mounted for rotation an I-armature. The armature is composed of a three-part core, the central part being adapted to receive two coils 18 18$^a$, connected together, and the outer parts being fastened to the central part by screws 19 19$^a$. Two ring-contacts, as indicated in the diagram Fig. 11, form the terminals of the armature-coil and current is led in by brushes, as indicated. Secured to the armature-shaft is a crank 20, (see Fig. 10,) which is hollow, the barrel being provided with a slot in its wall in which may slide the pin 13, a coil-spring 21 pressing the pin inward. This permits the ready introduction and withdrawal of the shutter from the drum, the pin 13 yielding and being forced back by the crank-disk 11 and remains in that position until the shutter is operated, when the pin drops into the slot 12. The shutter is controlled by means of a reversing-switch 22 of any suitable construction, and in order to prevent sparking I put in shunt to the armature-coils a small condenser 23. The circuits for the motor and switch may lead from any suitable source and may be the current which supplies the arc-lamp of the projector.

In case of damage to the controlling-circuits a shutter of the electromagnetic type of construction may be operated by a hand-wheel 24, mounted on an extension of the armature-shaft and projecting through the drum.

What I claim as new, and desire to secure by Letters Patent, is—

1. In combination with a search-light, a shutter for admitting or obstructing light, arranged to fit within the casing of the search-light and comprising a plurality of radially-arranged slats, and means for shifting all of the slats simultaneously to open or close the shutter.

2. In combination with a search-light, a signaling-shutter, comprising a plurality of radially-arranged slats, connections between the several slats and a common operating device, and means for rotating the latter.

3. In combination with a search-light, a signaling-shutter comprising a plurality of radially-mounted overlapping slats, and means for rocking them simultaneously through a definite angle to permit the transmission of light or cut it off.

4. A signaling-shutter comprising a plurality of pivoted slats mounted to rock through a definite angle, the edges of the slats interlocking, and means for opening or closing them.

5. A signaling-shutter, comprising a plurality of radial slats pivoted to rock through a definite angle, means controlled from the outside of the shutter, for rocking one slat, and means whereby all the other slats are turned simultaneously with said slat.

6. A shutter comprising a plurality of radially-pivoted slats controlled by a common operating device, and a hub provided with a flange overlapping the inner ends of the slats.

7. A signaling-shutter comprising a plurality of radial slats, each provided with a tubular axis pivoted on spokes connecting a rim and hub, and means for operating all of the slats simultaneously.

8. A signaling-shutter for a projector, provided with a plurality of movable slats adapted to rock to permit of transmission or cut off the light, operating mechanism stationary within the drum, and a detachable connection permitting the shutter to be withdrawn or inserted into operative relation to said mechanism.

9. A signaling-shutter provided with a plurality of movable slats, gearing connecting the several slats together, an operating-shaft, a crank-disk within a plane bounding the periphery of the rim, a crank-shaft in fixed relation to the drum, and a detachable connection permitting the shutter to be withdrawn or inserted in the door of the drum.

10. A signaling-shutter provided with a plurality of slats formed of sheet metal and having the opposite sides bent in reverse directions to permit each slat to interlock with its neighbor, and means for rocking the slats to transmit the signals.

11. The combination with a search-light, of a signaling-shutter comprising a plurality of slats, connections for operating all of the slats simultaneously, and an electromagnet operating device for effecting such operation.

12. The combination with a search-light, of a signaling-shutter provided with a plurality of slats adapted to rock through a definite angle, connections for effecting the simultaneous operation of all the slats, an electromagnet controlling such operation, and a switch controlling the circuit of the electromagnet.

13. In a signaling projector-shutter, the combination of a plurality of pivoted slats, an electromagnet controlling the simultaneous operation of the slats, a circuit-controller on the outside of the projector, and a hand-operating device for independently operating the shutter.

In witness whereof I have hereunto set my hand this 9th day of August, 1900.

JOHN L. HALL.

Witnesses:
BENJAMIN B. HULL,
MARGARET E. WOOLLEY.